United States Patent [19]
Lucero

[11] 3,926,561
[45] Dec. 16, 1975

[54] GAS ANALYSIS EMPLOYING SEMI-PERMEABLE MEMBRANE

[75] Inventor: Daniel P. Lucero, Triangle, Va.

[73] Assignee: Meloy Laboratories, Inc., Springfield, Va.

[22] Filed: May 13, 1974

[21] Appl. No.: 469,467

[52] U.S. Cl............ 23/232 R; 23/232 C; 23/254 R; 73/23.1; 73/38; 55/16; 55/158; 55/160
[51] Int. Cl.²..................... G01N 31/08; G01N 1/22; B01D 53/22
[58] Field of Search .......... 23/253 R, 254 R, 232 C, 23/232 R, 230 R; 73/23.1, 38; 55/16, 158, 160

[56] References Cited
UNITED STATES PATENTS

| | | | |
|---|---|---|---|
| 3,545,931 | 12/1970 | McKinley, Jr...................... | 23/254 R |
| 3,572,994 | 3/1971 | Hochstasser ....................... | 23/253 R |
| 3,604,246 | 9/1971 | Toren ................................ | 55/16 X |
| 3,619,986 | 11/1971 | Mormont et al..................... | 55/158 |
| 3,772,909 | 11/1973 | Anderson............................ | 73/23.1 |

OTHER PUBLICATIONS

Lucero et al., "Sample Enrichment Techniques for a Gas Chromatograph/Mass Spectrometer Analysis System", J. of Gas Chromatography, Vol. 6, Sept. 1968, pp. 477–482.
Lucero, "Design of Palladium Alloy Electrolytic Separators for GC–MS Analysis Systems", J. of Chromatographic Science, Vol. 9, Feb. 1971, pp. 105–115.
Lucero, "Design of Membrane–Covered Polarographic Gas Detectors", Anal. Chem., Vol. 41, No. 4, April 1969, pp. 613–622.

*Primary Examiner*—R. E. Serwin
*Attorney, Agent, or Firm*—Shapiro and Shapiro

[57] ABSTRACT

A semi-permeable membrane is employed in gas analysis utilizing Fick's First and/or Second Laws of Diffusion. In some embodiments a series of time-separated plateaus is obtained, the timing of the plateaus representing different molecular species, and the height of the plateaus corresponding to the respective concentrations. In other embodiments the membrane device is used in conjunction with conventional analytical devices, such as gas chromatograph columns. The membrane transversely divides a diffusion cell having a pair of cylindrical housing parts, each containing a cup-shaped core with an end wall spaced from the membrane to provide transverse radial flow passages at opposite sides of the membrane and with the side walls spaced from the side wall of the housing to provide longitudinal flow passages of annular cross-section. Fluid is admitted to each longitudinal passage by means of an enlarged circumferential flow distributing passage and is exhausted from each transverse passage by means of a conduit extending through the end wall of the associated core. Electric heating elements are supported upon the side wall of the housing and are controlled by temperature sensors in the transverse passages adjacent to the permeable membrane. The entire housing is surrounded by insulation so that precise control of the temperature within the housing is possible.

32 Claims, 12 Drawing Figures

GAS ANALYSIS EMPLOYING SEMI-PERMEABLE MEMBRANE

REFERENCE TO CO-PENDING APPLICATION

This application discloses apparatus disclosed and claimed in co-pending Ser. No. 320,660, filed Jan. 2, 1973, now U.S. Pat. No. 3,833,016, for "Apparatus for Precisely Controlled Dilution of Fluid Samples," incorporated herein by reference.

BACKGROUND OF THE INVENTION

This invention relates to the analysis of fluid samples and is more particularly concerned with gas analysis employing diffusion through a permeable membrane.

Various types of instruments and techniques have been employed heretofore for the analysis of gases. The conventional gas chromatograph, a well known analytical instrument, employs a column to resolve a mixture of molecular species, the species being eluted from the column in a carrier gas at different times, producing a series of time-separated peaks in the output of a suitable detector. From the timing of the peaks it is often possible to identify various constituents of the sample, the height of the peaks being a function of the concentration of the constituents. To increase the utility of the gas chromatograph, it is sometimes employed in combination with a mass spectrometer which acts as the detector, the output stream of the chromatograph being supplied to the spectrometer through suitable interfacing apparatus. Even with this combination, the resolution of certain species is not reliably obtained. Moreover, gas chromatographs are generally quite expensive and complex instruments.

BRIEF DESCRIPTION OF THE INVENTION

It is accordingly a principal object of the present invention to provide novel and improved fluid analysis apparatus and methods which may be used alone or in conjunction with other types of apparatus, such as the gas chromatograph and/or the mass spectrometer.

Another object of the invention is to provide apparatus and methods employing semi-permeable membranes and utilizing Fick's First and/or Second Law of Diffusion.

Briefly stated, a preferred embodiment of the present invention employs a diluter of the type disclosed and claimed in the aforesaid copending application. In that device a sample gas diffuses through a semi-permeable membrane into a carrier gas, the carrier gas containing the diluted sample being supplied to an appropriate detector. One aspect of the present invention is based upon the discovery that a device such as that disclosed in the aforesaid co-pending application may be employed as a principal component of an analytical instrument employing Fick's Second Law of Diffusion to resolve sample species and to determine their concentration. In accordance with the invention, the sample and a flush gas are supplied alternately to one side of the membrane. By appropriate selection of the membrane material and thickness and by appropriate control of the temperature and flow conditions, and selection of an appropriate detector, it is possible to produce a detector output comprising a series of time-separated plateaus, the timing of the plateaus identifying the sample constituents and the height of the plateaus corresponding to the concentration of the constituents.

A second aspect of the invention is based upon the discovery that a device such as that disclosed in the aforesaid copending application may be employed in conjunction with other types of apparatus such as a gas chromatograph column, and, by virtue of Fick's First Law of Diffusion, may enhance the analysis. In accordance with the invention a gas chromatograph column, for example, may be located upstream or downstream of the membrane device. The combined instrument may facilitate the separation of a single atomic or molecular species from many species of a sample, may avoid the undesired effects of certain gases present in a sample stream (such as the quenching effect of hydrocarbons upon a flame photometric detector [FPD]), and may even eliminate the need for a conventional gas chromatograph carrier gas.

BRIEF DESCRIPTION OF THE DRAWINGS

The invention will be further described in conjunction with the accompanying drawings, which illustrate preferred and exemplary embodiments, and wherein:

FIGS. 9A and 9B are block diagrams of modifications of the instrument;

DETAILED DESCRIPTION OF THE INVENTION

As pointed out above, the present invention employs the diffusion of a sample gas through a gas-permeable wall, such as a semi-permeable membrane. Before the analytical instruments and methods of the invention are described in detail, it is appropriate to describe the dilution apparatus of the aforesaid co-pending application, because that apparatus is the gaseous diffusion apparatus perferably employed in the present invention.

Figure 1:
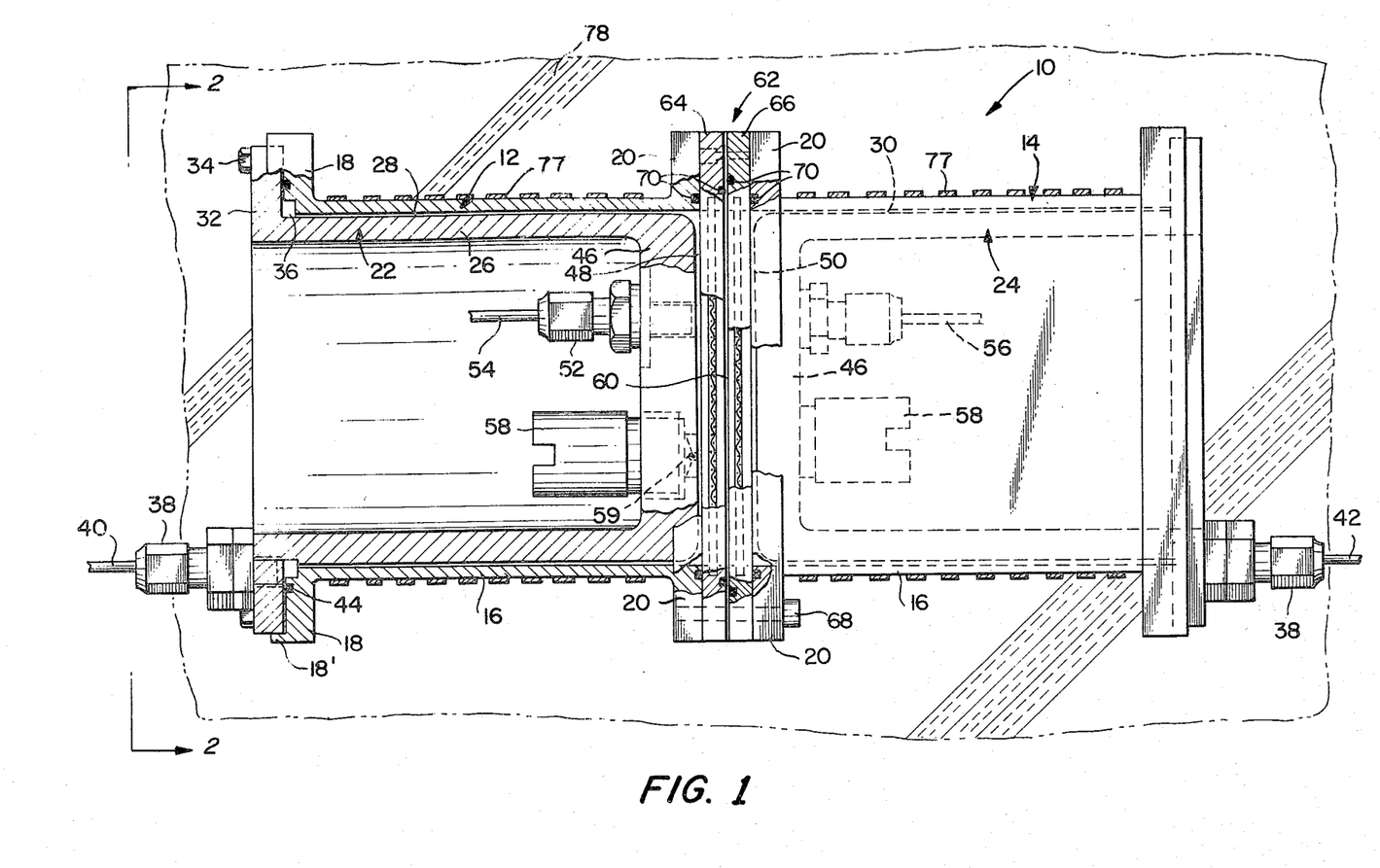
FIG. 1 is a side elevation view, partly in section, illustrating the diluter apparatus disclosed and claimed in the aforesaid co-pending application and employed in the present invention.

Referring to the drawings, and initially to FIG. 1 thereof, the dilution apparatus 10 of the co-pending application comprises a temperature regulated enclosure having a tubular housing. The housing is preferably a circular cylinder constituted by two cylindrical housing parts 12 and 14, each having a side wall 16. The housing parts are preferably identical (or very similar), so that a description of one suffices for both. Each has circular flanges 18 and 20 extending outwardly from the side wall at opposite ends therof. The housing parts may be formed of aluminum, but it is preferred that all surfaces in contact with the gas streams be Teflon coated or formed of Teflon.

Figure 2:
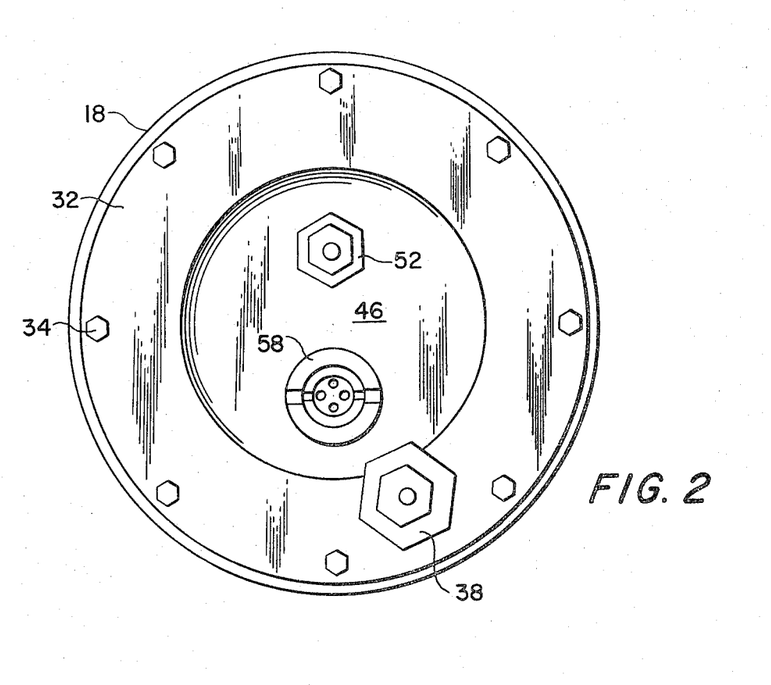
FIG. 2 is an end view of the apparatus as seen in the direction of the arrows 2—2 of FIG. 1.

Each housing part contains a concentric cylindrical cup-shaped core 22 and 24, with the side walls 26 thereof spaced from the associated side walls 16 of the housing parts to provide long, thin, annular longitudinal passages 28 and 30 of large surface area. The cores, which may be formed of aluminum, for example, are preferably identical and each has an outwardly extending circumferential flange 32 at the open end thereof. Engagement of flanges 32 with flanges 18 limits the insertion of each core into the associated housing part. Lips 18' of flanges 18 surround flanges 32. Screws 34 secure the cores to the housing parts in proper spacial relationship (see FIGS. 1 and 2).

To distribute gas circumferentially as it enters, an enlarged passage 36 is provided at one end of each of the longitudinal passages 28 and 30, and these flow distributing passages are provided with couplings 38 by which the passages are connected to inlet conduits 40 and 42. An O-ring 44 provides a seal between flanges 18 and 32 at each end of the housing.

When the cores have been inserted into the corresponding housing parts so that the flanges 32 engage the flanges 18 as shown, the end walls 46 of the cores will be spaced from a transverse wall of the housing, to be described more fully hereinafter, to provide transverse passages 48 and 50 which communicate with the longitudinal passages 28 and 30, respectively. The end wall 46 of each core is provided with a coupling 52 whereby exhaust conduits 54 and 56 are coupled through the end walls to the passages 48 and 50, respectively. Feed-through plugs 58 are threaded into corresponding receptacles in the end walls 46 to support and seal temperature sensors 59, such as thermistors, in the transverse passages 48 and 50.

Figure 3:
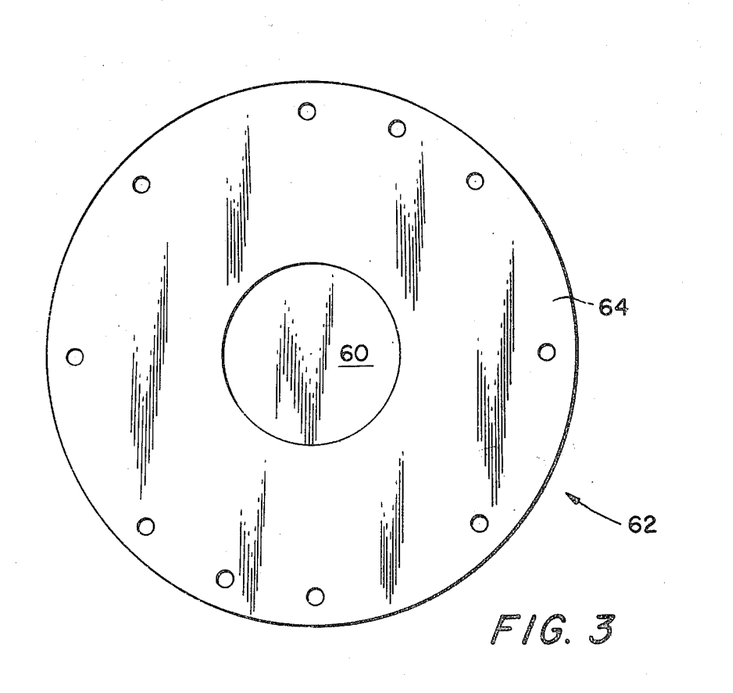
FIG. 3 is a side elevation view of a membrane and membrane support.
Figure 4:
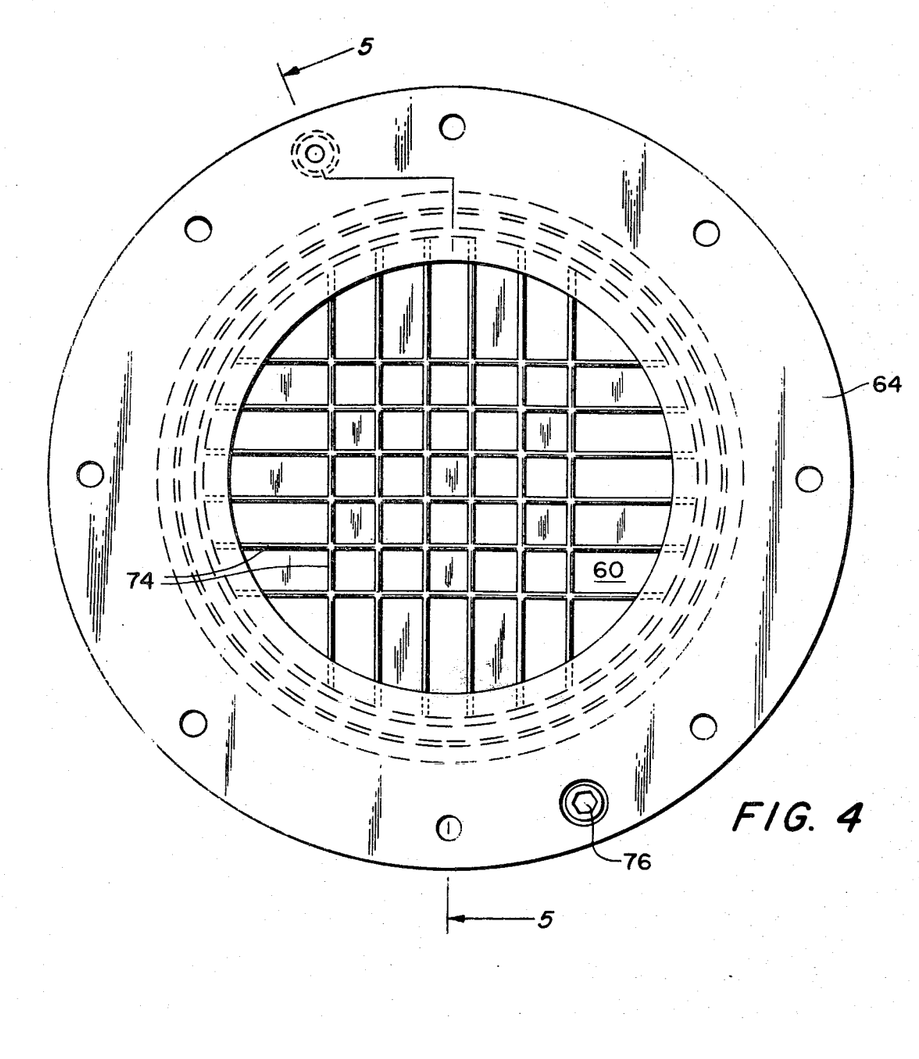
FIG. 4 is a side elevation view of another membrane and membrane support.
Figure 5:
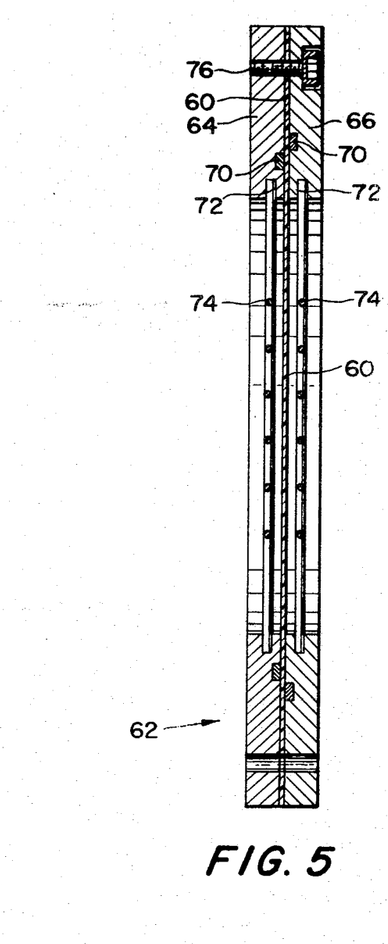
FIG. 5 is a transverse sectional view taken along line 5—5 of FIG. 4.

The housing of the dilution apparatus 10 is assembled by longitudinally aligning the housing parts 12 and 14 and by connecting them together with a transverse wall interposed therebetween. In the form shown, the transverse wall comprises a permeable membrane 60 supported upon a membrane holder 62. The membrane holder may comprise a pair of annular aluminum plates 64 and 66 (which are Teflon coated) with the membrane sandwiched therebetween, plates 64 and 66 being abutted with the flanges 20 of the respective housing parts 12 and 14 and screws 68 serving to connect the flanges 20 together with the membrane assembly interposed therebetween. O-rings 70 are provided between the abutting surfaces to prevent fluid leakage. FIG. 3 illustrates a simple membrane and membrane holder, while FIGS. 4 and 5 illustrate a more complex membrane holder in which the annular plates 64 and 66 are provided with inwardly facing circumferential grooves 72 which receive screens or grids 74 at opposite sides of the membrane 60. Since the membrane is preferably a very thin sheet (as of Teflon, for example) and hence at high temperature and other conditions may not be entirely self-supporting, the grids 74 may be employed to assist in supporting a membrane of large area or diameter. The screens may be No. 4 mesh and woven of .035 inch diameter stainless steel wire which is Teflon coated. Screws 76 are shown for coupling the annular plates 64 and 66 to form an assembly prior to insertion of the membrane and membrane holder into the housing.

Figure 7:
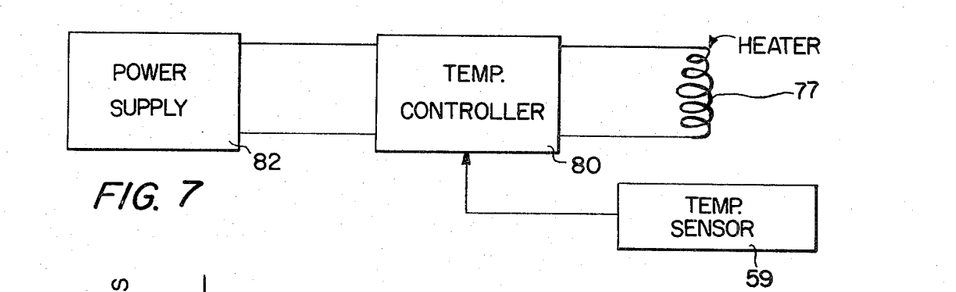
FIG. 7 is a block diagram of a temperature control system employed with the apparatus.

A heater element 77 is supported on the exterior of the side wall 16 of each of the housing parts 12 and 14. The heater elements may be electric heater coils comprised of insulated heater tape wound helically upon the housing. Thermal insulation 78 surrounds the entire enclosure, so as to isolate the enclosure from ambient conditions. FIG. 7 illustrates one of the heater coils 77 in association with a corresponding temperature sensor 59, a temperature controller circuit 80, and a power supply 82. The temperature controller may be a conventional solid state of other type of device which precisely regulates the electric power supplied to the heater in response to the temperature sensor and which may be adjusted to provide different equilibrium temperatures. Such temperature controllers are well known in the art.

Figure 6:
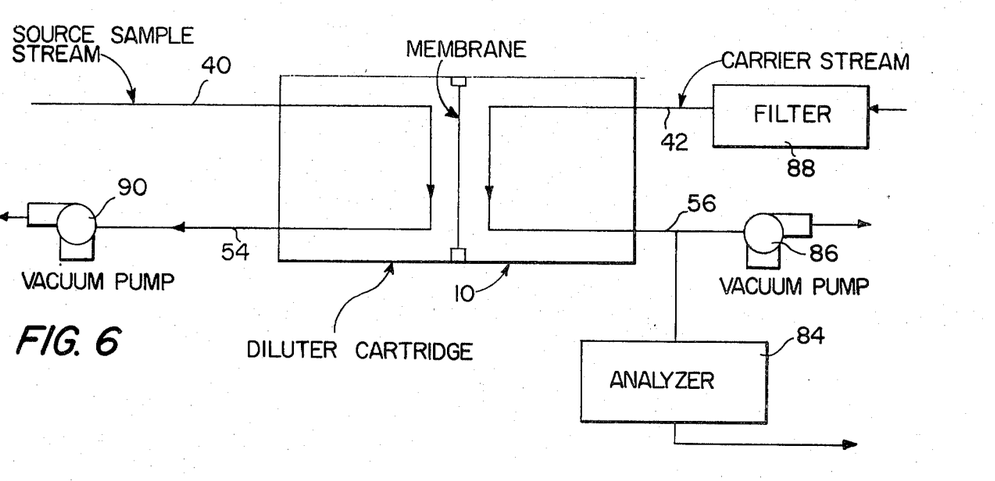
FIG. 6 is an explanatory flow diagram of a system employing the foregoing apparatus.

FIG. 6 illustrates diagrammatically the manner in which the dilution apparatus 10 may be employed to supply a precisely controlled diluted sample to an analyzer 84. A vacuum pump 86 is connected to the exhaust conduit 56, the inlet conduit 42 being connected to a supply of air (the carrier gas) through a filter 88. Similarly, a vacuum pump 90 is connected to the exhaust conduit 54, the inlet conduit 40 being connected to a suitable sample source, such as a flue gas stream. Referring now to FIG. 1 in conjunction with FIG. 6, it will be seen that the carrier gas and the flue gas sample are admitted to the corresponding flow distributing passages 36, by which these gases are distributed about the circumference of the inlets of the longitudinal passages 28 and 30. The gases then flow along the length of the passages 28 and 30 in intimate contact with the side walls 16 of the associated housing parts, upon which the heaters 77 are mounted. The long, thin, large-surface-area annular flow paths thus provided for each of the gases insure that the gases are heated to an elevated temperature level and that precise control of the temperature of the gases is maintained in the transverse passages 48 and 50 adjacent to the permeable membrane 60. By virtue of the construction of the apparatus, it is possible to insure precise heating temperature regulation of these gases over a large range of carrier gas and sample gas input temperatures and flow rates. For example, equilibrium temperature is readily attained at the end of passages 28 and 30 adjacent to the membrane for a range of from 200 to 1600 ml/min. and for inlet gas temperatures from 0°C. to 100°C. At all conditions specified, the gas equilibrium temperatures are within plus or minus 0.1°C. or better.

Dilution of the gaseous samples supplied to the analyzer occurs by virtue of the diffusion process through the permeable membrane 60 as the sample gas flows generally radially in the transverse passage 48 and as the carrier or diluent gas flows generally radially in the transverse passage 50. A portion of the sample gas stream mass diffuses through the membrane, and on the opposing side of the membrane the carrier gas stream mixes with the sample permeating the membrane. Some (or all) of the carrier gas stream containing the sample is bled from conduit 56 to the analyzer 84.

The dilution apparatus is essentially a combined membrane holder and precisely controlled mass/heat exchanger. The dilution apparatus can dilute samples with accuracy and precision to as large as $10^6$. By changes of the membrane dimensions and/or temperature, dilution factors can be varied substantially. Larger variations are attainable by changing membrane material to provide materials having different permeability coefficient activation energy and by providing variations in the carrier stream flow rate. However, it has been found that the degree of dilution is relatively independent of the sample gas flow rate over a wide range of flow rates. Hence the pressures at opposite sides of the membrane may be equalized by adjusting the sample and carrier gas flow rates, thereby reducing membrane stresses. The rate of diffusion can be controlled conveniently merely by adjusting the temperature at the membrane and/or by simply substituting one membrane assembly (of different exposed membrane area) for another. Typically, the membrane may be a sheet of Teflon of 0.002 inch thickness. The rate of dilution varies logarithmically with the temperature, and hence constancy of temperature, which is achieved by the invention, is important if constant dilution rate is to be maintained. However, by intentionally changing the equilibrium temperature, the range of sample concentration in the carrier gas for a given sample gas concentration range may be shifted to accomodate the particular analyzer.

The dual-ended construction of the diluter provides economy and simplicity, because the housing parts and cores are interchangeable. The provision of the heater on the exterior of the housing (not on the core or inside of the housing) simplifies the construction. Air baths, preheating coils, and complex gas circulation paths are not required for temperature control. Compactness and efficiency are promoted by the reverse gas flow through each housing part, the gas flowing along the outside of the core in one direction and then reversely through the core in the opposite direction.

The following analytical discussion will assist in an understanding of the principles of the diluter and the effect of certain parameters:

The source sample and carrier gas streams are exposed to each other through the membrane. Transfer of each molecular species from one side of the membrane to the other occurs by a diffusion process. The concentration or partial pressure difference of each molecular species across the membrane is the diffusion potential. For example, consider the transport of sulphur dioxide ($SO_2$) across the membrane. Carrier stream $SO_2$ concentration at the exit of the dilution apparatus is related to the membrane $SO_2$ diffusion flow rate by the relationship:

$$[SO_2]_C = [Q_{SO_2}/Q_c]10^6 \qquad (1)$$

$[SO_2]_C$ = Carrier stream $SO_2$ concentration level, ppm.
$Q_{SO_2}$ = Membrane $SO_2$ diffusion flowrate, ml/min.
$Q_c$ = Carrier stream flowrate, ml/min.

For a membrane whose lateral dimensions are much larger than its thickness, $Q_{SO_2}$ is related to the sample stream $SO_2$ concentration by the expression:

$$Q_{SO_2} = \frac{60 P_m A}{(\Delta X)} [P_{SO_2,s} - P_{SO_2,c}] \qquad (2)$$

$P_m$ = Membrane material $SO_2$ permeability coefficient, cc/sec-cm$^2$-torr/cm.
$A$ = Membrane cross-sectional diffusion area, cm$^2$.
$(\Delta X)$ = Membrane thickness, cm.
$P_{SO_2,s}$ = Sample stream $SO_2$ partial pressure, torr.
$P_{SO_2,c}$ = Carrier stream $SO_2$ partial pressure, torr.

Under most operating conditions $P_{SO_2,s} \gg P_{SO_2,c}$ and $P_{SO_2,c} \to 0$. For example, at 100°C a 5.6 cm diameter and 0.00254 cm thick TFE Teflon membrane will reduce a 1000 ppm $SO_2$ sample gas concentration to approximately 0.56 ppm in a 200 ml/min carrier stream.

Combining equations (1) and (2) and expressing $P_{SO}$ in terms of $SO_2$ concentration relates $[SO_2]_C$ and $[SO_2]_S$ at the diluter carrier stream exit and sample stream entrance as shown below:

$$[SO_2]_C = 60 K_m [SO_2]_S (P_{TS}/Q_c) \qquad (3)$$

$K_m$ = Membrane $SO_2$ conductance, cc/sec-torr. $P_{TS}$ = Diluter sample side total gas pressure, torr.

The membrane conductance is composed of the ratio $P_m A/(\Delta X)$.

The essential characteristics of the diluter are summarized by equation (3) and a dilution factor defined to directly relate $[SO_2]_S$ and $[SO_2]_C$. It is $$k_d = \frac{60 P_m A P_{TS}}{(\Delta X) Q_c}$$

where $k_d$ = dilution factor, dimensionless. Within practical limits, any parameter comprising $k_d$ can be varied to obtain a specific dilution or to match analyzer interface requirements. Further, the relative importance of the parameters can be assessed and the theoretical performance limits of the diluter established.

Inspection of equation (3) and $k_d$ shows the effects of $A$, $(\Delta X)$, and $Q_c$. The changes in $k_d$ are directly related to these parameters. Less direct variations are those induced by membrane temperature and material. For example, membrane permeability coefficient varies with temperature in a logarithmic fashion. Therefore, it is possible to obtain significant changes in $k_d$ with membrane temperature. The magnitude of the changes is directly related to permeability coefficient activation energy of the membrane material for the sample gas. Thus, temperature stability measurements can be broadened when employing a membrane material of relatively low permeability activation energy such as fluorosilicone and other silicone rubbers. Materials of higher activation energy are polyethylene and polypropylene.

During operation it is essential to control variations of each parameter to the degree prescribed by the requirements of the analyzer. Accuracy and precision tolerances in dilution are directly affected by the degree of temperature control. For example, operation of a Teflon membrane at 200° C with ±1°C temperature control will produce variations or absolute errors in $k_d$ of approximately −1.4% and +2.2% due to changes in $SO_2$ permeability alone. At lower operating temperatures the error is correspondingly less. Further examination of $k_d$ reveals that the diluter parameters can be classified into thermal, pneumatic, and dimensional categories: membrane temperature, sample gas total pressure and carrier gas flowrate, and membrane thickness and cross-sectional area, respectively.

Figure 8:
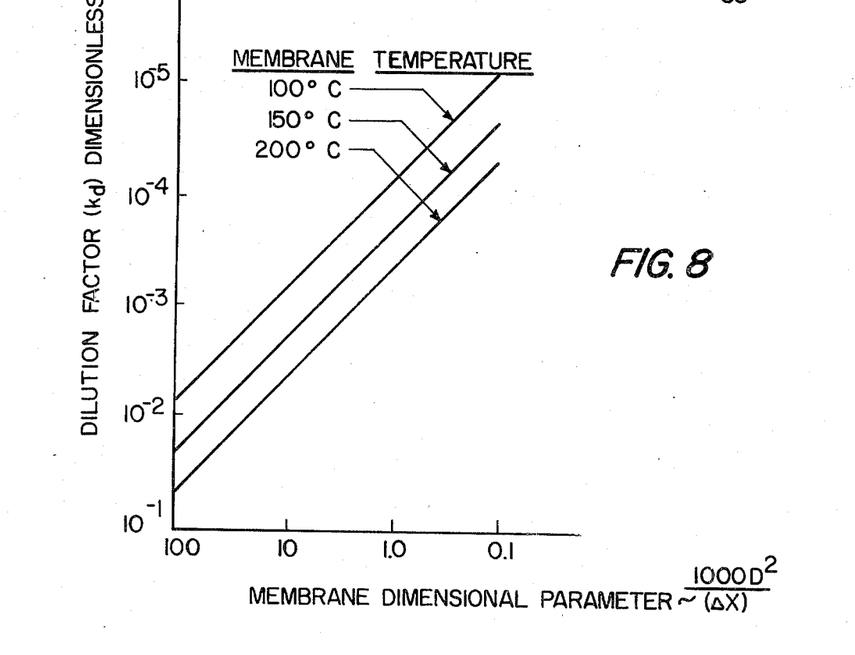
FIG. 8 is an explanatory graphical diagram.

For a specific membrane material, the membrane dimensions and temperature are established by $k_d$ and the carrier gas flowrate ($Q_c$). FIG. 8 is a graphical representation of equation (3). It is an illustration of the typical relationship between the dilution factor ($k_d$), membrane temperature, and membrane dimensional parameter (which for a circular membrane is $$\frac{1000 D^2}{(\Delta X)}.$$

where D is the diameter, cm). It is clear that only the required $k_d$ constrains the diluter design. Since it is most convenient to utilize a membrane of a standard fabricated thickness, FIG. 8 may be employed to establish the membrane cross-sectional area. A lower limit to the operating temperature in most applications is determined by other sample properties, such as dew point. Operating temperature, as well as membrane thickness, is usually defined by time rate of response requirements.

In a practical embodiment of the diluter, each of the housing parts is 3.74 inches long with an outer diameter of 3.38 inches (neglecting the flanges) and an inner diameter of 3.13 inches. Each core is 3.84 inches long with an outer diameter of 3.08 inches (neglecting the flange) and an inner diameter of 2.56 inches. Flanges 20 and 32 are .25 inch thick and flanges 18 are .38 inch thick (neglecting lips 18'). Annular plates 64 and 66 are .187 inch thick. In an $SO_2$ diluter dilution factors of 101,000, 4975, and 1660 have been attained at 106°C, 140°C, and 203°C, respectively, with 0.0065 cm thick Teflon membranes.

The manner in which a membrane device of the foregoing type may be employed in accordance with different embodiments of the present invention will now be described.

Figure 9:
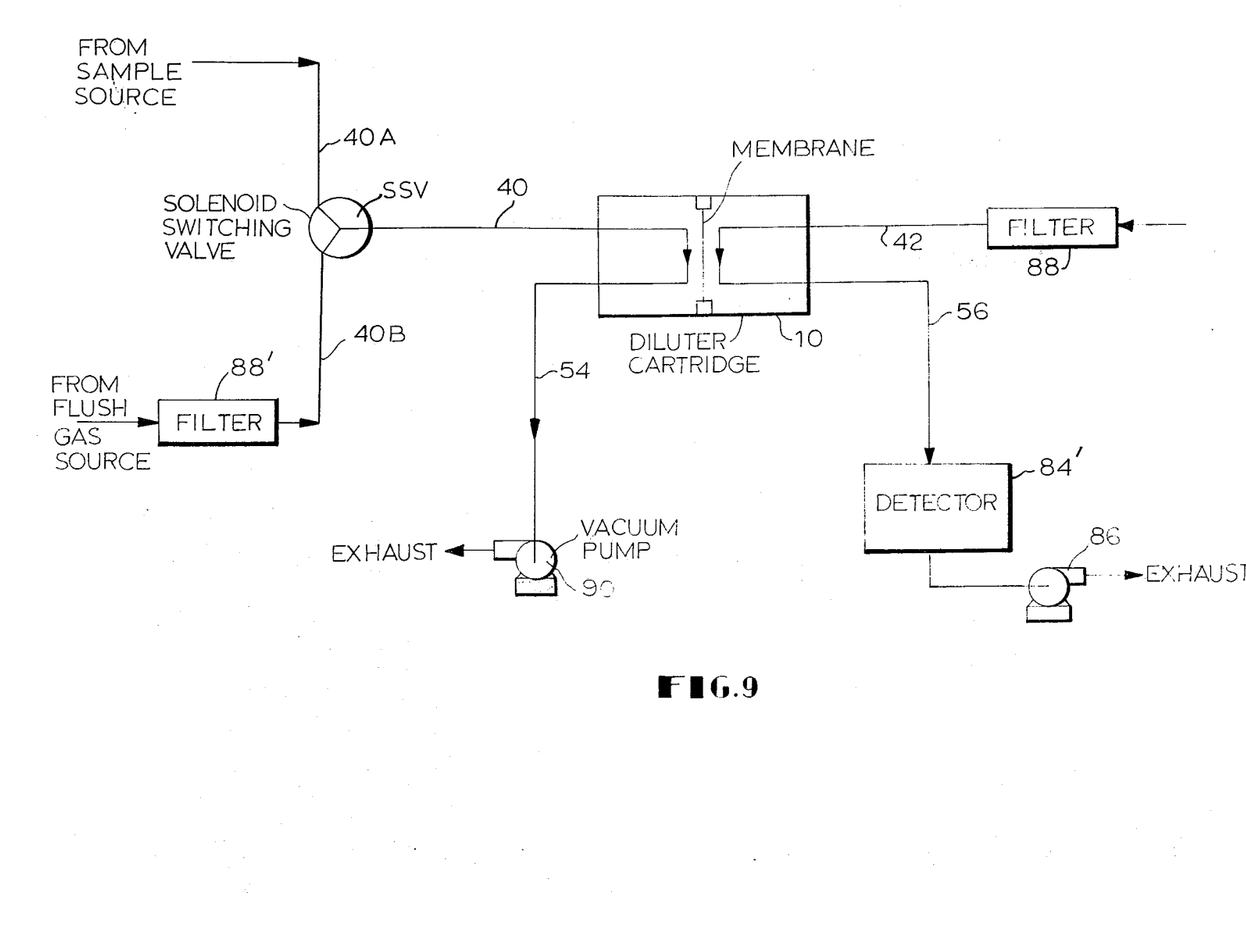
FIG. 9 is a block diagram of an analytical instrument in accordance with the present invention.

FIG. 9 illustrates the utilization of the diluter cartridge 10 in an analytical instrument of the invention utilizing Fick's Second Law of Diffusion. Interposed in the sample conduit 40 is a solenoid switching valve SSV which alternately connects to conduit 40 a conduit 40A from the sample source and a conduit 40B from a flush gas source. Typically, the flush gas supplied in conduit 40B and carrier gas supplied to conduit 42 may both be clean air, the filters 88 and 88' being employed to remove any contaminants from the air. When the sample host gas affects the base line of the detector, the flush gas should be pure host gas. The carrier gas exhaust conduit 56 is shown connected directly to a detector 84' (which should be construed to include a recorder), through which the gas is drawn by vacuum pump 86 connected to the exhaust side of the detector. Under appropriate circumstances the arrangement shown in FIG. 6, in which a portion of the carrier gas output in conduit 56 is bled to the detector may be employed.

Figure 10:
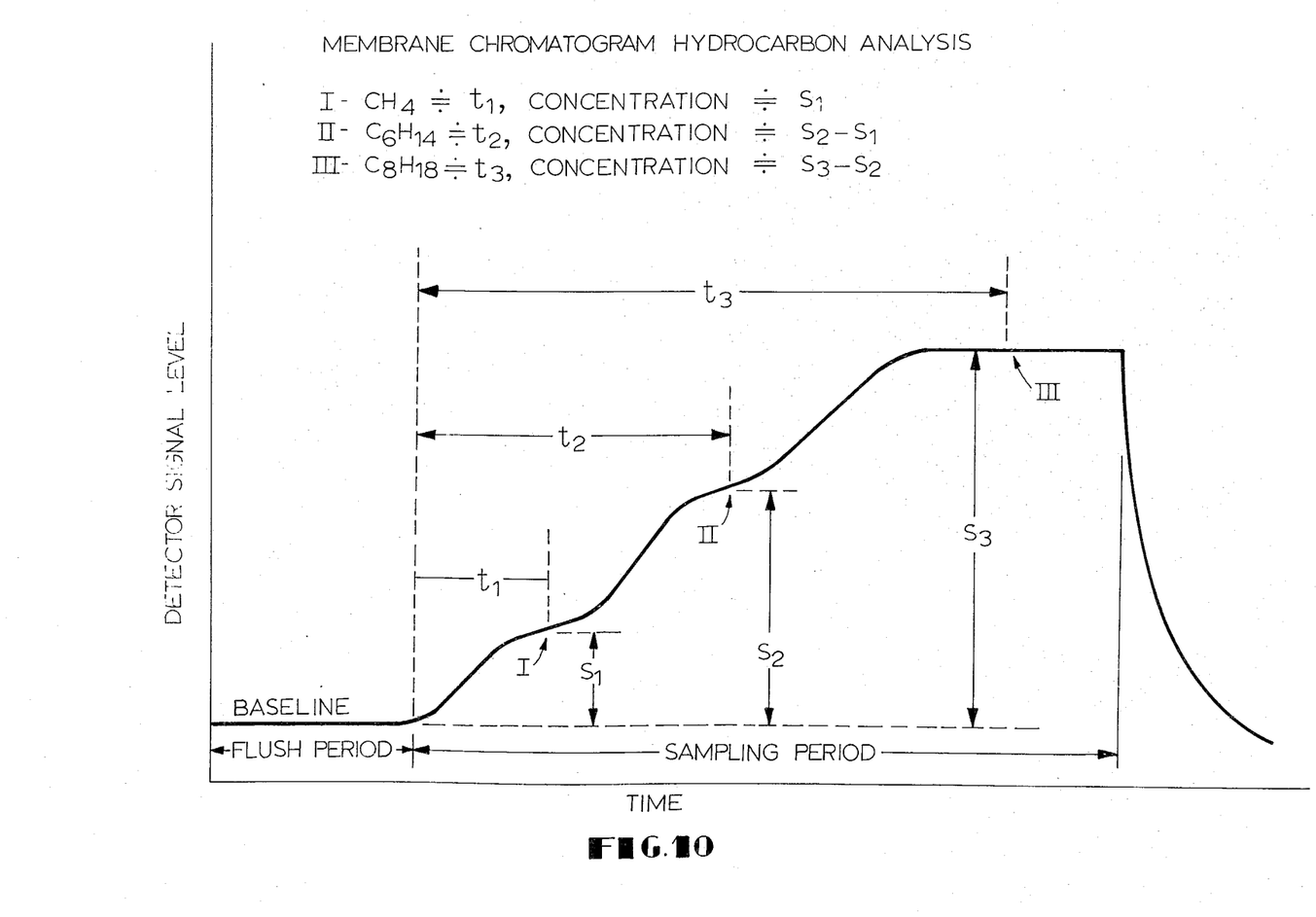
FIG. 10 is a diagram illustrating the detector signal level recorded as a function of time.

While in the aforesaid co-pending application the diluter 10 was employed to provide precise dilution of a sample of high concentration so that the sample might be measured by an analyzer having such high sensitivity that it would be swamped by the sample applied directly, in accordance with the present invention the diluter 10 is employed for quite a different purpose, namely, to provide a detector output having a series of plateaus separated in time, the timing of the plateaus identifying the sample constituents and the height of the plateaus being proportional to the sample concentration. As will be seen hereinafter, this performance requires that certain critical conditions be met. Broadly, however, the present invention utilizes Fick's Second Law of Diffusion to separate sample constituents having different diffusion coefficients. FIG. 10 is a typical recording of the detector signal level as a function of time, the curve representing a chromatogram of hydrocarbon analysis. Referring to FIG. 10 in conjunction with FIG. 9, the initial portion of the curve is a flush period, so-labeled, established by having the solenoid switching valve SSV connect flush gas source conduit 40B to conduit 40. During this period the flush gas, devoid of any sample, flows across the membrane to cleanse the membrane of any sample to which it has been previously exposed. Then the solenoid switching valve abruptly disconnects conduit 40B and connects conduit 40A to conduit 40, so that the membrane is exposed to the sample source abruptly, as a step change. At the time that the sample gas is introduced, the concentration of the dissolved sample gas molecules in the membrane begins to increase to saturation levels proportional to the partial pressure or concentration of the gas molecules comprising the sample. The rate of saturation or rate of change of gas concentration within the bulk of the membrane after a step change from flush to sample gas is described, as an approximation, by $$V_m \frac{dC_m}{dt} = \left[\frac{DA}{(\Delta X)_m}\right]\left[C_s - C_c\right] \quad (4)$$

where:
$V_m$ = membrane material volume, cm³,
$C_m$ = gas concentration in membrane, mole/cm³,
$C_s$ = gas concentration at membrane-sample interface, moles/cm³,
$C_c$ = gas concentration at membrane-carrier interface, moles/cm³,
$\Delta X$ = membrane thickness, cm,
$A$ = membrane diffusion cross-sectional area, cm²,
$D$ = membrane gas diffusion coefficient, cm²/sec.,
$t$ = time, sec.

Since D can differ widely for each molecular species of a gas sample, equation (4) must be modified to correspond to each species. With respect to the time $t = 0$ when flush gas is replaced with sample gas, the following conditions prevail:

$C_s = 0$ at $t \leq 0$, $C_c = 0$ at $t \leq 0$
$C_s = C_s$ at $t \geq 0$, $C_c = C_m$ at $t \geq 0$ The solution to equation (4) is:
$C_m = C_s [1 - e^{-\alpha t}]$
where
$\alpha = D/(\Delta X)^2$ and $1/\alpha$ is the membrane saturation time constant for a particular molecular species corresponding to the magnitude of $D$.

At the opposite face of the membrane, the carrier gas mixes with the permeating sample gas molecules and transports them to the detector. The sample concentration of the carrier is equal to the ratio of the permeating species flow rate to the carrier gas flow rate. For example, at the end of the flush period or start of the sampling period, the concentration of hexane in the carrier varies with time as shown by equation:

$$[C_6 H_{14}] = \frac{60 \, P_m \, A \, P_{TS}}{Q_c \, (\Delta X)}[1 - e^{-\alpha t}] \, 10^6 \quad (5)$$

$[C_6 H_{14}]$ = hexane concentration of carrier gas, ppm
$P_m$ = membrane material hexane permeability coefficient
$p$ = hexane partial pressure of sample gas, torr
$Q_c$ = carrier gas flow rate, ml/min.

The chromatogram shown in FIG. 10 is illustrative of an analysis of a sample containing different species. This analysis is representative of a sample containing a mixture of hydrocarbon molecules such as $CH_4$, $C_6H_{14}$, $C_8H_{18}$. The molecular species possessing the largest diffusion coefficient (D) is represented by the first wave or signal plateau. A second wave is generated by the molecular species with the next largest diffusion coefficient, and a third wave is generated by the molecular species with the next largest diffusion coefficient. Thus, plateaus I, II and III are produced at times $t_1$, $t_2$, $t_3$, respectively, for the corresponding constituents. The concentration of each constituent can be determined from the level of each plateau relative to the level of the preceding plateau (or the base line in the case of the first plateau).

The sampling period is made long enough to permit the system to reach equilibrium, so that all of the resolvable constituents of the sample can be resolved. Then the solenoid switching valve SSV is switched back to its initial condition to provide flush gas to the membrane in order to purge the membrane of any sample. Another sampling period may then ensue when the solenoid switching valve is switched again. When measurements are to be made continuously, the switching valve will cycle from sample source to flush gas repetitively, being driven by a motor, for example.

It is apparent from FIG. 10 that the plateaus do not necessarily have zero slope, but in most instances are distinguishable by regions of the detector signal curve having smaller slope than the adjacent regions. If the plateaus are sufficiently separated in time, the precise point at which the timing of the plateaus is determined is not critical, but the measurements should preferably be made with respect to approximately the same point on each plateau, such as a half-way mark. This is believed to be analogous to the half-wave potential in polarographic electrochemical analysis. In a completely automated system, the detector output current may be supplied to a slope detection circuit which produces a pulse whenever the signal curve changes the sign of the rate of change of its slope in time, i.e., the point in time where the second derivative of the signal is equal to zero. This condition will occur as the membrane is saturated with each molecular species comprising the sample. The timing of these pulses may be compared automatically with standard pulse timings to produce a direct output of the corresponding constituents, and the pulses may be employed to energize level measuring circuits, which compare the level of the curve with the level at the time of the preceding pulse to give a direct readout of concentration.

A practical analytical instrument performing in the foregoing manner requires that certain critical conditions prevail:

1. The detector must be of sufficient sensitivity to respond to the molecule after dilution by the membrane.

2. The difference in diffusion coefficients of the various molecule species must be of sufficient magnitude to provide adequate separation in time.

3. The time rate of response of the detector must be more rapid than the rate at which the membrane is saturated with sample molecules for any species to be detected.

4. The delay time between the insertion of the sample in the membrane diluter and the detection of the same at the carrier gas side should be small and due predominantly to Fick's Second Law of Diffusion through the membrane. This requires small gas volumes in the diluter cartridge and/or high gas velocities.

5. The surfaces exposed to the gas should be nonreactive physically and chemically. These surfaces may be constituted by Teflon material, for example.

The dilution factor can be varied by varying the thickness of the membrane, the area of the membrane, the membrane material, or the temperature of the membrane. While a decrease in dilution factor can compensate for a detector of low sensitivity, the difference in diffusion coefficient must still be sufficient to provide adequate separation in time. For a membrane gas analysis system in accordance with the invention utilizing a flame photometric detector as detector 84', the lower detectable limit in the sample may be about 0.5 ppm but this could be lowered to 0.25 ppm by increasing the membrane diameter from 3 inches to 4 inches. Other types of detectors, such as electron capture detectors, flame ionization detectors, etc. may be employed where appropriate. In all instances it is contemplated that the detector will be part of or will be associated with apparatus having the usual pneumatic control devices, such as the precise flow rate controlled commonly employed with flame photometric detectors. Although the invention is illustrated in FIG. 9 under vacuum operating conditions, filters which produce flush gas and carrier gas from an ambient source or from bottled gas can also be utilized.

It is believed that for a detector with a response time of 1 second, the molecular separation by the membrane should be at least 5 seconds. In this case adequate separation is obtained for molecules with diffusion coefficient differences of ±8% and ±50% at $1 \times 10^{-7}$ and $5 \times 10^{-7}$ cm$^2$/sec. levels respectively. Thus, it appears that the smaller the diffusion coefficients of the molecules the more separation can be obtained, indicating that better resolution will be obtained by operation at lower temperatures. It appears that a detector with 1 second response time will not be able to distinguish between molecules with diffusion coefficients larger than $5 \times 10^{-6}$ cm$^2$/sec. and that a detector with a one-tenth second response time will not be able to distinguish between molecules with diffusion coefficients larger than about $1 \times 10^{-5}$ cm$^2$/sec.

In the embodiment of FIG. 9, just described, the invention takes advantage of the differences of the rates at which different molecular species saturate a permeable or semi-permeable membrane in accordance with Fick's Second Law of Diffusion. This may be looked upon as a transient phenomenon. The embodiments of the invention now to be described utilize Fick's First Law of Diffusion and are based upon the differences of the membrane permeability coefficient for different gases. These embodiments may be looked upon as steady state embodiments. In the last-mentioned embodiments the diluter cartridge is employed in conjunction with conventional analytical (sample-resolving) devices, such as a gas chromatograph column, for example. It should be understood, however, that the utilization of the membrane device in conjunction with conventional analytical devices is not intended to be limited to the utilization of Fick's First Law of Diffusion. In fact, in certain applications of the invention, it may well be desirable to employ the membrane cartridge in the transient mode of FIG. 9.

Figure 11:
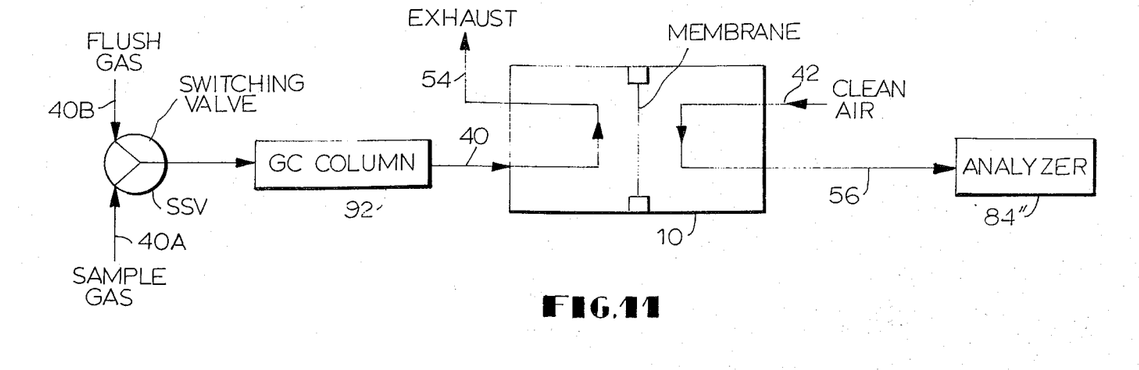
FIG. 11 is a block diagram of an analytical instrument employing a membrane device in conjunction with a gas chromatograph column in accordance with the invention.

Turning now to FIG. 11, an embodiment of the invention is illustrated in which the membrane cartridge 10 operates in conjunction with a gas chromatograph column 92. The column (or columns) is interposed in line 40 between the switching valve SSV and the cartridge 10. The carrier gas exhaust line 56 is connected to an analyzer 84". The pumps or other pressure or vacuum sources required to move the sample and the carrier gas are, for simplicity, not shown in FIG. 11. The apparatus may be operated in a positive pressure mode or a vacuum mode. The analyzer 84" includes the conventional detector (such as an FPD), pneumatic apparatus, etc. Filters for the flush gas and carrier gas are not shown (for simplicity).

In the arrangement of FIG. 11, the membrane cartridge 10 serves as a column-analyzer interface. Sample gas and flush gas are alternately passed through the sample switching valve SSV, gas chromatograph column 92, membrane cartridge 10, and exhaust line 54 for periods of time until concentration equilibrium is attained in all elements. The sample analysis is performed during the sample gas flow phase of the cycle. In accordance with the invention, the sample gas may be injected directly into the column without requiring a conventional gas chromatograph carrier gas stream (such as nitrogen or helium), avoiding this additional gas flow volume and avoiding dilution of the sample thereby. The sample gas stream itself may thus constitute both the carrier and the sample for the gas chromatograph column.

The embodiment of FIG. 11 may be employed, for example, in the analysis of sulphur or sulphur compounds in a sample stream having a high hydrocarbon concentration level. In the usual analysis of such sample streams by the employment of a flame photometric detector, the interference or "quenching" effect of the hydrocarbons may be very severe. By the utilization of a Teflon membrane, for example, having substantially greater permeability for some inorganic sulphur compounds than for hydrocarbon molecules, the interference effect may be greatly reduced or eliminated, because the concentration of the sulphur relative to the hydrocarbons in the carrier gas supplied to the analyzer 84" will be substantially increased. The measurement of many inorganic sulphur compounds in the presence of long-chain sulphonated hydrocarbon molecules will also be enhanced by the invention. The membrane interface permits greater use of atom-specific detectors, especially where the same atom or atoms exist in several molecular species common to the sample gas. Different membrane materials and different detectors (such as the flame ionization detector) may be employed to provide greater specificity to particular atomic or molecular species.

Figure 12:
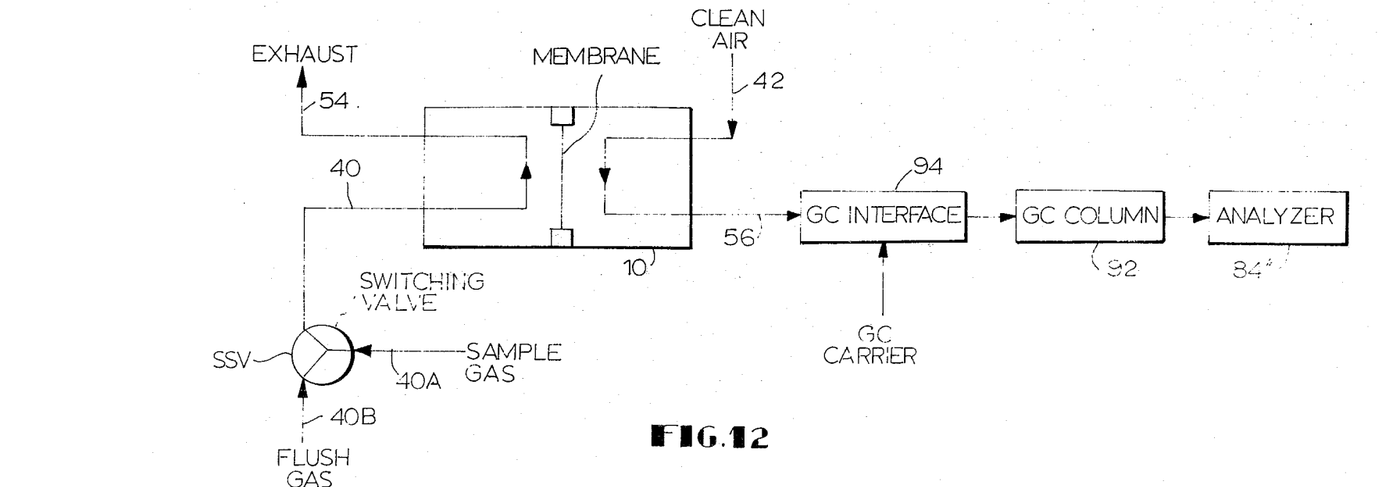
FIG. 12 is a block diagram of a modification of the instrument of FIG. 11.

FIG. 12 illustrates a modification in which a gas chromatograph column 92 is downstream of the membrane cartridge 10. In this case a conventional sample-gas chromatograph interface 94 may be employed. The usual gas chromatograph carrier may be supplied to this interface, which includes the usual sample switching valve. Such an interface may be employed in the embodiment of FIG. 11 before the gas chromatograph column also, if desired. In the embodiment of FIG. 12 if the apparatus is operated in the vacuum mode, interface 94 may be eliminated, and the gas chromatograph may utilize the carrier (clean air) of the membrane cartridge 10 as its carrier also.

In the embodiment of FIG. 11, the gas chromatograph column 92 operates in the usual manner during the interval that the sample gas is supplied thereto to produce an output stream on line 40 in which the constituents of the sample are separated in time. The detection of certain species by the detector of analyzer 84" will then be enhanced by the membrane cartridge 10, since during the sample analysis interval certain species will permeate the membrane much more rapidly than others. In the embodiment of FIG. 12, on the other hand, the membrane cartridge 10 serves to vary the concentration of certain sample gas stream species in the carrier gas supplied to the gas chromatograph column 92. The embodiment of FIG. 11 permits further resolution of the peaks in the output of the gas chromatograph column by the transient analysis phenomenon described in connection with FIG. 9, since the gas flow parameters in the sub-system including the membrane cartridge 10 and the analyzer 84" can be readily controlled to emphasize that phenomenon.

Although a gas chromatograph column has been illustrated in FIGS. 11 and 12, other types of apparatus, such as a liquid chromatograph or a mass spectrometer, may be employed in conjunction with the membrane cartridge 10. As an example, the membrane cartridge 10 may serve as an interface between the gas chromatograph column and a mass spectrometer (substituted for the analyzer 84"), an appropriate interface being supplied between the cartridge 10 and the mass spectrometer. In general, the membrane device may be used with any apparatus which conditions the sample (such as a GC column or a cold trap) or with any analyzer (such as a mass spectrometer or a thermal conductivity detector) to enhance the analysis.

Temperature programming of the membrane may be employed to increase further the versatility of the invention. This concept is based upon the membrane material temperature variation of permeability and diffusion coefficients for particular gases. The characteristic variations is logarithmic with inverse absolute temperature.

Figure 13:
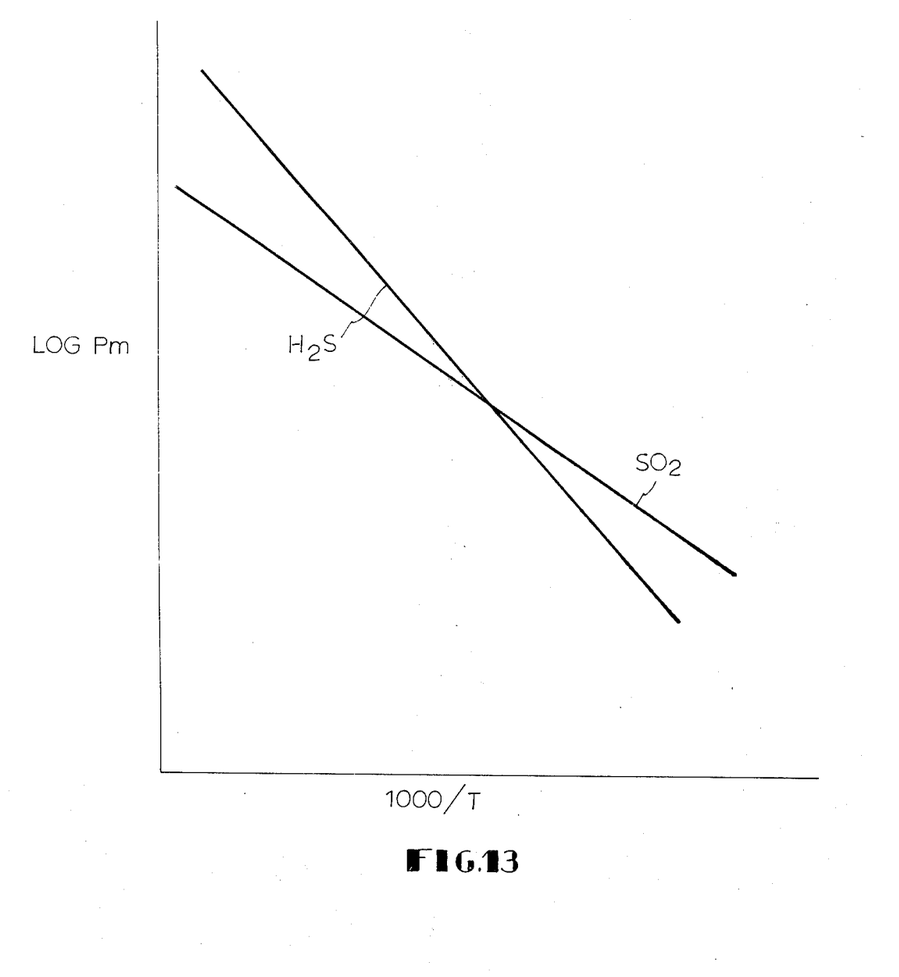
FIG. 13 is a graphical diagram illustrating the variation of the log permeability coefficient versus the inverse temperature of a membrane for different molecular species.

FIG. 13 illustrates the variation for a Teflon membrane for two gases such as $SO_2$ and $H_2S$, the ordinate being the log permeability coefficient $P_m$ and the abscissa being the inverse of absolute temperature $T$. Each gas possesses a characteristic slope. The magnitude of the slope is peculiar to the gas molecule and the membrane material. The permeability coefficient $P_m$ and the difference in permeability coefficient for the two gases vary with temperature. Therefore, by temperature programming the membrane, distinct elution characteristics can be obtained for particular molecules in the same manner as temperature programming of a gas chromatograph column. In fact, both the column and the membrane can be temperature programmed for further separation. The temperature may vary automatically in accordance with a prescribed program (relative to time) or may be varied manually to take advantage of the different characteristics of the membrane material at different temperatures.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Fluid sample analysis apparatus comprising means defining first and second fluid flow paths separated by a wall saturable to different sample constituents at different rates, means for alternately supplying to said first flow path a fluid sample to be analyzed and a flush fluid, means for supplying a carrier fluid to said second flow path, whereby said sample constituents which permeate said wall are introduced to said carrier fluid to form a fluid mixture, and detector means for detecting the presence of sample constituents in said mixture at different times dependent upon the corresponding saturation rates.

2. Apparatus in accordance with claim 1, wherein said detector means has means for producing a recording of the output of said detector means as a function of time, whereby said output is recorded as a series of plateaus distinguishable in time and amplitude, the timing of each plateau identifying a corresponding sample constituent, and the amplitude of each plateau with respect to the preceding plateau designating the concentration of the corresponding sample constituent.

3. Apparatus in accordance with claim 1, wherein the first-mentioned supplying means comprises a source of sample fluid, a source of flush fluid, and means for alternately connecting said sources to said first flow path.

4. Apparatus in accordance with claim 3, wherein the last-mentioned means comprises a valve and means for operating said valve repetitively to connect said sources alternately to said first path.

5. Apparatus in accordance with claim 1, wherein said flush fluid comprises pure fluid sample host fluid.

6. Apparatus in accordance with claim 1, further comprising means for maintaining said wall at a selected constant temperature.

7. Apparatus in accordance with claim 6, wherein the last-mentioned means comprises means for controlling the temperature of said fluids.

8. Apparatus in accordance with claim 1, wherein said wall comprises a semi-permeable membrane.

9. Apparatus in accordance with claim 1, wherein each of said flow paths comprises a first passage adjacent to and substantially parallel to said wall and a second passage extending toward said wall.

10. Apparatus in accordance with claim 9, further comprising means for supplying controlled amounts of heat to said second passages.

11. Apparatus in accordance with claim 10, wherein said wall divides a cylindrical chamber transversely.

12. Apparatus in accordance with claim 11, wherein said chamber contains a cylindrical core on each side of said wall defining said second passages between an outer wall of each core and an inner wall of the chamber and defining said first passages between an end of each core and the permeable wall.

13. A method of fluid sample analysis comprising providing first and second fluid flow paths separated by a wall saturable to different sample constituents at different rates, alternately supplying to said first path a fluid sample to be analyzed and a flush fluid, supplying a carrier fluid to said second path, whereby said sample constituents which permeate said wall are introduced to said carrier fluid to form a fluid mixture, and detecting the presence of sample constituents in said mixture at different times dependent upon the corresponding saturation rates.

14. A method in accordance with claim 13, further comprising detecting the concentration of the last-mentioned constituents.

15. A method in accordance with claim 14, wherein said detecting comprises recording a signal having a series of plateaus the timing of which is dependent upon the presence of corresponding constituents and the amplitude of which relative to that of the preceding plateau is dependent upon the concentration of said corresponding constituents.

16. A method in accordance with claim 13, further comprising precisely controlling the temperature and flow rates of said fluids.

17. A method in accordance with claim 16, wherein said controlling comprises varying said temperature according to a program during said detecting.

18. A method in accordance with claim 13, wherein said sample and flush fluids are supplied repetitively and the sample is supplied abruptly.

19. Fluid sample analysis apparatus comprising a fluid sample resolving device, a fluid diluter, and a fluid detector connected in sequence, said fluid diluter having a wall with different permeabilities for different sample constituents, said wall separating first and second fluid flow paths, means for supplying a fluid sample to said resolving device, means for supplying fluid from said resolving device to said first path, and means for supplying a carrier fluid to said second path and then to said detector.

20. Apparatus in accordance with claim 19, wherein said resolving device comprises a gas chromatograph column.

21. Apparatus in accordance with claim 20, wherein said fluid sample constitutes the gas chromatograph carrier.

22. Apparatus in accordance with claim 19, further comprising means for supplying said fluid sample to said resolving device alternately with a flush fluid.

23. Fluid sample analysis apparatus comprising a fluid diluter, a fluid chromatographic sample resolving device and a fluid detector connected in sequence, said fluid diluter having a wall with different permeabilities for different sample constituents, said wall separating first and second fluid flow paths, means for supplying a fluid sample to said first path, means for supplying a carrier fluid to said second path and then to said resolving device, and means for supplying fluid from said resolving device to said detector.

24. Apparatus in accordance with claim 23, wherein said resolving device comprises a gas chromatograph column.

25. Apparatus in accordance with claim 24, wherein said carrier fluid constitutes the gas chromatograph carrier.

26. Apparatus in accordance with claim 23, further comprising means for supplying said fluid sample to said first path alternately with a flush fluid.

27. Apparatus in accordance with claim 1, wherein said sample supplying means comprises means for supplying a fluid stream containing sulfur and hydrocarbon constituents.

28. A method in accordance with claim 13, wherein a fluid sample containing sulfur and hydrocarbon constituents is supplied to said first fluid path.

29. Apparatus in accordance with claim 19, wherein said sample supplying means comprises means for supplying a fluid stream containing sulfur and hydrocarbon constituents.

30. Apparatus in accordance with claim 29, wherein said detector is a flame photometric detector.

31. Apparatus in accordance with claim 23, wherein said sample supplying means comprises means for supplying a fluid stream containing sulfur and hydrocarbon constituents.

32. Apparatus in accordance with claim 31, wherein said detector is a flame photometric detector.

* * * * *